(12) United States Patent
Nguyen et al.

(10) Patent No.: US 12,139,120 B2
(45) Date of Patent: Nov. 12, 2024

(54) OPTIMIZING INTEGRATED TRAILER BRAKE CONTROL FOR BATTERY ELECTRIC VEHICLE (BEV) APPLICATIONS

(71) Applicant: GM GLOBAL TECHNOLOGY OPERATIONS LLC, Detroit, MI (US)

(72) Inventors: Michael Nguyen, Stoney Creek (CA); Gursimran Chauhan, Courtice (CA); Corey A Robinson, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 17/938,483

(22) Filed: Oct. 6, 2022

(65) Prior Publication Data

US 2024/0116479 A1    Apr. 11, 2024

(51) Int. Cl.

| B60T 7/20 | (2006.01) |
| B60L 7/26 | (2006.01) |
| B60L 58/12 | (2019.01) |
| B60T 8/17 | (2006.01) |
| B60T 8/171 | (2006.01) |
| B60T 8/172 | (2006.01) |

(52) U.S. Cl.
CPC .................. *B60T 7/20* (2013.01); *B60L 7/26* (2013.01); *B60L 58/12* (2019.02); *B60T 8/1701* (2013.01); *B60T 8/171* (2013.01); *B60T 8/172* (2013.01); *B60L 2240/12* (2013.01); *B60L 2240/26* (2013.01); *B60T 2250/02* (2013.01); *B60T 2250/04* (2013.01); *B60T 2270/604* (2013.01)

(58) Field of Classification Search
CPC .......... B60T 7/20; B60T 8/1701; B60T 8/171; B60T 8/172; B60T 2250/02; B60T 2250/04; B60T 2270/604; B60L 58/12; B60L 7/26; B60L 2240/12; B60L 2240/26
See application file for complete search history.

(56) References Cited

U.S. PATENT DOCUMENTS

| 2017/0021731 A1* | 1/2017 | Suzuki ................. B60T 8/1755 |
| 2019/0263268 A1* | 8/2019 | Fracchia .............. B60T 13/586 |
| 2021/0138876 A1* | 5/2021 | Vanous ................ G01R 31/382 |
| 2023/0226920 A1* | 7/2023 | Lee ....................... B60T 13/586 |
| | | 701/70 |
| 2023/0347855 A1* | 11/2023 | Plow ...................... B60T 8/349 |
| 2023/0364999 A1* | 11/2023 | Pettersson ............. B60L 3/108 |

* cited by examiner

*Primary Examiner* — Behrang Badii
*Assistant Examiner* — Jay Khandpur
(74) *Attorney, Agent, or Firm* — Lorenz & Kopf LLP

(57) ABSTRACT

In exemplary embodiments, methods and systems are provided that include: sensors configured to obtain sensor data for a vehicle having both friction braking and regenerative braking capabilities and coupled to a trailer, the sensor data including: friction braking data as to a vehicle friction braking force for the vehicle; and regenerative braking sensor data as to a vehicle regenerative braking force for the vehicle; and a processor coupled to the sensors and configured to at least facilitate controlling braking of the trailer by providing trailer braking force, via instructions provided by the processor, based on both the friction braking data and the regenerative braking sensor data, with a sensitivity toward the vehicle regenerative braking force such that the trailer braking force is affected differently by the vehicle regenerative braking force versus the vehicle friction braking force.

12 Claims, 2 Drawing Sheets

OPTIMIZING INTEGRATED TRAILER BRAKE CONTROL FOR BATTERY ELECTRIC VEHICLE (BEV) APPLICATIONS

INTRODUCTION

The technical field generally relates to vehicles and, more specifically, to methods and systems for controlling braking of a trailer coupled to a vehicle.

Certain vehicles today include functionality for towing a trailer that is coupled to the vehicle. Certain of these vehicles also include regenerative braking capabilities, such as in the case of battery electric vehicle (BEV) applications. Certain of these vehicles also include functionality for controlling braking of a trailer that is coupled to the vehicle. However, existing vehicles may not always optimally control the braking of the trailer.

Accordingly, it is desirable to provide improved methods and systems for controlling braking of a trailer that is coupled to a vehicle, including in the case of battery electric vehicle applications. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining sensor data via one or more sensors of a vehicle having both friction braking and regenerative braking capabilities and coupled to a trailer, the sensor data including friction braking data as to a vehicle friction braking force for the vehicle and regenerative braking data as to a vehicle regenerative braking force for the vehicle; and controlling braking of the trailer by providing trailer braking force, via instructions provided by a processor of the vehicle, based on both the friction braking data and the regenerative braking sensor data, with a sensitivity toward the vehicle regenerative braking force such that the trailer braking force is affected differently by the vehicle regenerative braking force versus the vehicle friction braking force.

Also in an exemplary embodiment, step of obtaining the sensor data further includes obtaining additional sensor data for the vehicle from the one or more sensors; and the step of controlling the braking of the trailer further includes: calculating, via the processor, a dynamic regenerative scaling factor based on the additional sensor data; and providing the trailer braking force, via the instructions provided by the processor, based on both the friction braking data and the regenerative braking sensor data, with the sensitivity toward the vehicle regenerative braking force based on the dynamic regenerative scaling factor.

Also in an exemplary embodiment: the additional sensor data comprises RESS data as to a charging capability of a rechargeable energy storage system (RESS) of the vehicle; and the dynamic regenerative scaling factor reflects the charging capability of the RESS based on the RESS data.

Also in an exemplary embodiment, the dynamic regenerative scaling factor reflects a stability of the vehicle.

Also in an exemplary embodiment: the additional sensor data pertains to a speed of the vehicle; and the dynamic regenerative scaling factor reflects the stability of the vehicle based at least in part on the speed of the vehicle.

Also in an exemplary embodiment: the additional sensor data pertains to a mass of the trailer; and the dynamic regenerative scaling factor reflects the stability of the vehicle based at least in part on the mass of the trailer.

Also in an exemplary embodiment, the dynamic regenerative scaling factor also reflects user inputs from a user of the vehicle with regard to the user's personal preference to trailer brake reaction in response to regenerative braking forces.

Also in an exemplary embodiment: the sensor data further includes requested braking force data pertaining to a requested friction braking force from a drive system of the vehicle; and the step of providing the trailer braking force includes: calculating a total negative axle torque based on each of the following: the friction braking data, the regenerative braking sensor data, the requested braking force data, and the dynamic regenerative scaling factor; and providing the trailer braking force, via the instructions provided by the processor, to be proportional to the total negative axle torque.

Also in an exemplary embodiment, the total negative axle torque is calculated by the processor in accordance with the following equation: TNAT=RegenForce*K+FrictionForce−PropFrictionRequestedForce*(1−K), in which "TNAT" represents the total negative axle torque; "RegnForce" represents the vehicle regenerative braking force; "FrictionForce" represents the vehicle friction braking force; "PropFrictionRequestedForce" represents the requested friction braking force from the drive system of the vehicle; and "K" represents the dynamic regenerative scaling factor.

In another exemplary embodiment, a system is provided that includes: one or more sensors configured to obtain sensor data for a vehicle having both friction braking and regenerative braking capabilities and coupled to a trailer, the sensor data including: friction braking data as to a vehicle friction braking force for the vehicle; and regenerative braking sensor data as to a vehicle regenerative braking force for the vehicle; and a processor that is coupled to the one or more sensors and that is configured to at least facilitate controlling braking of the trailer by providing trailer braking force, via instructions provided by the processor, based on both the friction braking data and the regenerative braking sensor data, with a sensitivity toward the vehicle regenerative braking force such that the trailer braking force is affected differently by the vehicle regenerative braking force versus the vehicle friction braking force.

Also in an exemplary embodiment: the one or more sensors are further configured to obtain additional sensor data for the vehicle; and the processor is further configured to at least facilitate: calculating a dynamic regenerative scaling factor based on the additional sensor data; and providing the trailer braking force, via the instructions provided by the processor, based on both the friction braking data and the regenerative braking sensor data, with the sensitivity toward the vehicle regenerative braking force based on the dynamic regenerative scaling factor.

Also in an exemplary embodiment: the additional sensor data comprises RESS data as to a charging capability of a rechargeable energy storage system (RESS) of the vehicle; and the dynamic regenerative scaling factor reflects the charging capability of the RESS based on the RES S data.

Also in an exemplary embodiment, the dynamic regenerative scaling factor reflects a stability of the vehicle.

Also in an exemplary embodiment: the additional sensor data pertains to a speed of the vehicle; and the dynamic regenerative scaling factor reflects the stability of the vehicle based at least in part on the speed of the vehicle.

Also in an exemplary embodiment: the additional sensor data pertains to a mass of the trailer; and the dynamic regenerative scaling factor reflects the stability of the vehicle based at least in part on the mass of the trailer.

Also in an exemplary embodiment, the dynamic regenerative scaling factor also reflects user inputs from a user of the vehicle with regard to the user's personal preference to trailer brake reaction in response to regenerative braking.

Also in an exemplary embodiment: the sensor data further includes requested braking force data pertaining to a requested friction braking force from a drive system of the vehicle; and the processor is further configured to at least facilitate: calculating a total negative axle torque based on each of the following: the friction braking data, the regenerative braking sensor data, the requested braking force data, and the dynamic regenerative scaling factor; and providing the trailer braking force, via the instructions provided by the processor, to be proportional to the total negative axle torque.

Also in an exemplary embodiment, the processor is further configured to at least facilitate calculating the total negative axle torque is calculated by the processor in accordance with the following equation: TNAT=RegenForce*K+ FrictionForce−PropFrictionRequestedForce*(1−K), in which "TNAT" represents the total negative axle torque; "RegnForce" represents the vehicle regenerative braking force; "FrictionForce" represents the vehicle friction braking force; "PropFrictionRequestedForce" represents the requested friction braking force from the drive system of the vehicle; and "K" represents the dynamic regenerative scaling factor.

In another exemplary embodiment, a vehicle is provided that includes: a body configured to be coupled to a trailer having a trailer braking system; a vehicle braking system having both friction braking and regenerative braking capabilities; one or more sensors configured to obtain sensor data for the vehicle, the sensor data including: friction braking data as to a vehicle friction braking force for the vehicle; and regenerative braking sensor data as to a vehicle regenerative braking force for the vehicle; and a processor that is coupled to the one or more sensors and that is configured to at least facilitate controlling braking of the trailer by providing trailer braking force, via instructions provided by the processor to the trailer braking system, based on both the friction braking data and the regenerative braking sensor data, with a sensitivity toward the vehicle regenerative braking force such that the trailer braking force is affected differently by the vehicle regenerative braking force versus the vehicle friction braking force.

Also in an exemplary embodiment: the one or more sensors are further configured to obtain additional sensor data for the vehicle; and the processor is further configured to at least facilitate: calculating a dynamic regenerative scaling factor based on the additional sensor data; and providing the trailer braking force, via the instructions provided by the processor, based on both the friction braking data and the regenerative braking sensor data, with the sensitivity toward the vehicle regenerative braking force based on the dynamic regenerative scaling factor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
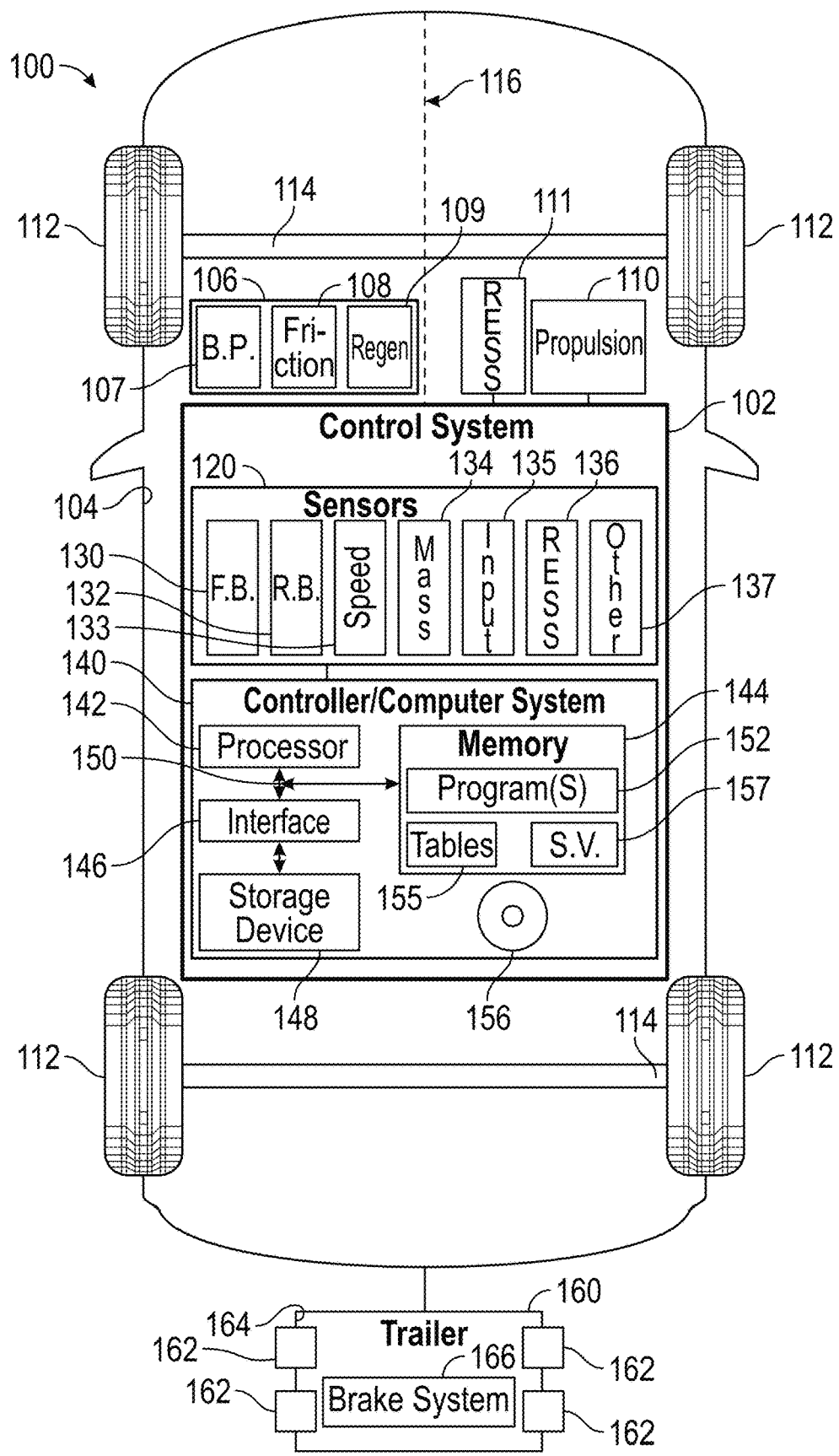
FIG. 1 is a functional block diagram of a vehicle having regenerative braking capabilities and that is coupled to a trailer having a trailer braking system, and wherein the vehicle includes a control system for controlling braking of the trailer via the trailer braking system while taking into account regenerative braking of the vehicle, in accordance with exemplary embodiments.

FIG. 1 illustrates a vehicle 100 that is configured to be coupled to a trailer 160, according to an exemplary embodiment. In various embodiments, the vehicle 100 has a rechargeable energy storage system (RESS) 111 (e.g., a vehicle battery), along with regenerative braking capability for the RESS 111.

As described in greater detail further below, the vehicle 100 includes a control system 102 that is configured for controlling braking of the trailer 160 while taking account of the regenerative braking of the vehicle 100, in accordance with exemplary embodiments. Specifically, as explained in greater detail further below in connection with the process 200 of FIG. 2, in various embodiments the control system 102 recognizes regenerative braking for the vehicle 100, and controls trailer braking after desensitizing the trailer braking response toward the regenerative braking torque. In various embodiments, this provides the vehicle 100 with greater opportunities to recoup the kinetic energy back into the RESS 111 of the vehicle 100, for example as described further below in connection with the process 200 of FIG. 2.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

Also in various embodiments, the trailer 160 may comprise any number of different types of trailers and/or other types of mobile platforms, for example that are coupled to the vehicle 100 and move along with the vehicle 100. As depicted in FIG. 1, in various embodiments, the trailer 160 includes, among other features, a plurality of wheels 162, a body 164, and a braking system 166. While the trailer 160 is depicted in FIG. 1 as having four wheels 162, it will be appreciated that the number of wheels 162 may vary in different embodiments.

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In various embodiments, the drive system 110 comprises a propulsion system. In various embodiments, the drive system 100 comprises one or more electric motors/generators, coupled with a transmission thereof. In various embodiments, the vehicle 100 comprises a battery electric vehicle (BEV) that utilizes the drive system 110 in combination with the RESS 111 of FIG. 1, and wherein the drive system (i.e., propulsion system) 110 utilizes power from the RESS 111. In certain embodiments, the drive system 110 may vary, and for example may also include one or more other types of motors, engines, and/or systems.

As depicted in FIG. 1, the vehicle also includes a braking system 106 (also referred to herein as a vehicle braking system). In exemplary embodiments, the braking system 106 controls braking of the vehicle 100 using braking components that are controlled via inputs provided by a driver, such as a brake pedal 107 as depicted in FIG. 1, and in certain embodiments, also via automatic control via the control system 102 (for example, with braking requested by the drive system 110 and/or the control system 102). Also in exemplary embodiments, the braking system 106 includes both a friction braking system (or component) 108 along with a regenerative braking system (or component) 109. In various embodiments, when friction braking is applied via the friction braking system 108, friction braking torque is applied for the vehicle 100, without recharging the RESS 111. Conversely, in various embodiments, when regenerative braking is applied via the regenerative braking system 109, regenerative braking torque is provided that recharges the RESS 111.

In the embodiment depicted in FIG. 1, the control system 102 is coupled to the braking system 106, the drive system 110, and the RESS 111 of the vehicle 100, as well as to the braking system 166 of the trailer 160. In various embodiments, the control system 102 may also be coupled to one or more other systems and/or components of the vehicle 100 and/or the trailer 160. Also as depicted in FIG. 1, in various embodiments, the control system 102 includes a sensor array 120 and a controller 140.

In various embodiments, the sensor array 120 includes various sensors that obtain sensor data for use in controlling braking for the vehicle 100 as well as for the trailer 160, among other potential functionality for the vehicle 100 and/or the trailer 160. In the depicted embodiment, the sensor array 120 includes one or more friction braking sensors 130, regenerative braking sensors 132, speed sensors 133, mass sensors 134, input sensors 135, and RESS sensors 136. In certain embodiments, the sensor array 120 may also include one or more other sensors 137.

In various embodiments, the friction braking sensors 130 collect friction braking data as to a friction braking torque of the vehicle 100. In certain embodiments the friction braking data may directly identify the friction braking torque, whereas in other embodiments the friction braking data may be utilized to calculate the friction braking torque. Also in certain embodiments the friction braking sensors may be coupled to the friction braking system 108 of the vehicle 100 and/or measure an amount of friction braking torque relating thereto; however, this may vary in other embodiments. Also in various embodiments, the regenerative braking sensors 132 collect regenerative braking data this used to determine a regenerative braking torque of the vehicle 100. In certain embodiments the regenerative braking data may directly identify the regenerative braking torque, whereas in other embodiments the regenerative braking data may be utilized to calculate the regenerative braking torque. Also in certain embodiments the regenerative braking sensors may be coupled to the regenerative braking system 109 of the vehicle 100 and/or measure an amount of regenerative braking torque relating thereto; however, this may vary in other embodiments.

In various embodiments, the speed sensors 133 measure an amount of speed (and/or changes thereof) of the vehicle 100. In certain embodiments, the speed sensors 133 comprise wheel speed sensors that measure a speed of one or more of the wheels 112 of the vehicle 100. In certain other embodiments, the speed sensors 133 may comprise one or more accelerometers and/or one or more other types of sensors that measure parameters pertaining to movement of the vehicle 100.

In various embodiments, the mass sensors 134 measure a mass of one or more both of the vehicle 100 and/or trailer 160. In certain embodiments, the mass sensors 134 measure a mass of the trailer 160 that is being towed by the vehicle 100. In certain other embodiments, the trailer mass may instead be inferred indirectly based on measurements of other vehicle parameters.

Also in various embodiments, the input sensors 135 measure one or more inputs from a driver or other user of the vehicle 100. In certain embodiments, the input sensors 135 measure a driver's engagement of the brake pedal 107 of the vehicle 100, such as an amount of force applied to the brake pedal 107 and/or a measure of travel of the brake pedal 107 as it is engaged by the driver. Also in certain embodiments, the input sensors 135 measure a driver or other user's personal preference to trailer brake reaction in response to regenerative braking forces. For example, in certain embodiments, the driver may select a "low", "medium", or "high" setting for a maximum tolerable level of trailer brake response towards regenerative braking torques, and so on.

Also in various embodiments, the RESS sensors 136 obtain measurements with respect to the RESS 111 of the vehicle 100. In certain embodiments, the RESS sensors 136 measure a charging capability of the RESS 136 and/or changes thereto. In certain embodiments the charging capability of the RESS 136 may be determined based on one or more parameters that may include, among others, a state of charge of the RESS 136, a loss of communications with the RESS and/or an RESS management system, and/or other faults and/or conditions that may prevent the vehicle from performing pure regenerative braking.

In various embodiments, the sensor array 120 may also include one or more other sensors 137. By way of example, in certain embodiments, the other sensors 137 may include one or more sensors of or associated with the drive system 110 that are configured to obtain a measure of braking requested via the drive system 110), and so on. By way of additional examples, in certain embodiments, the other sensors may also include, among other possible sensors, one or more inertial measurement unit (IMU) sensors, accelerometers, and/or detection sensors (e.g., cameras, radar, LIDAR, sonar, and/or other sensors).

In various embodiments, the controller 140 is coupled to the sensor array 120, the braking system 106 of the vehicle 100 (including the friction braking system 108 and the regenerative braking system 109), and the braking system 166 of the trailer 160. In certain embodiments, the controller 140 may also be coupled to the RESS 111, the drive system 110, and/or one or more other systems, devices, and/or components of the vehicle 100 and/or trailer.

In various embodiments, the controller 140 receives sensor data from the sensor array 120, processes the sensor data, and controls braking of the vehicle 100 and of the trailer 160 (via the vehicle braking system 106 and the trailer braking system 166, respectively) based on the processing of the sensor data, such as described further below in connection with the process 200 of FIG. 2. In addition, in certain embodiments, the controller 140 may also control propulsion and/or other vehicle functionality via the drive system 110, and/or other systems, devices, and/or components of the vehicle 100 and/or the trailer 160.

In various embodiments, the controller 140 comprises a computer system (and is also referred to herein as computer system 140), and includes a processor 142, a memory 144, an interface 146, a storage device 148, and a computer bus 150. In various embodiments, the controller (or computer system) 140 controls vehicle and trailer operation, including braking for the trailer 160. In various embodiments, the controller 140 provides these and other functions in accordance with the steps of the process 200 of FIG. 2.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more tables 155 and other stored values 157, including for control of the trailer 160 based on the processing of the sensor data that is obtained from the sensor array 120.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
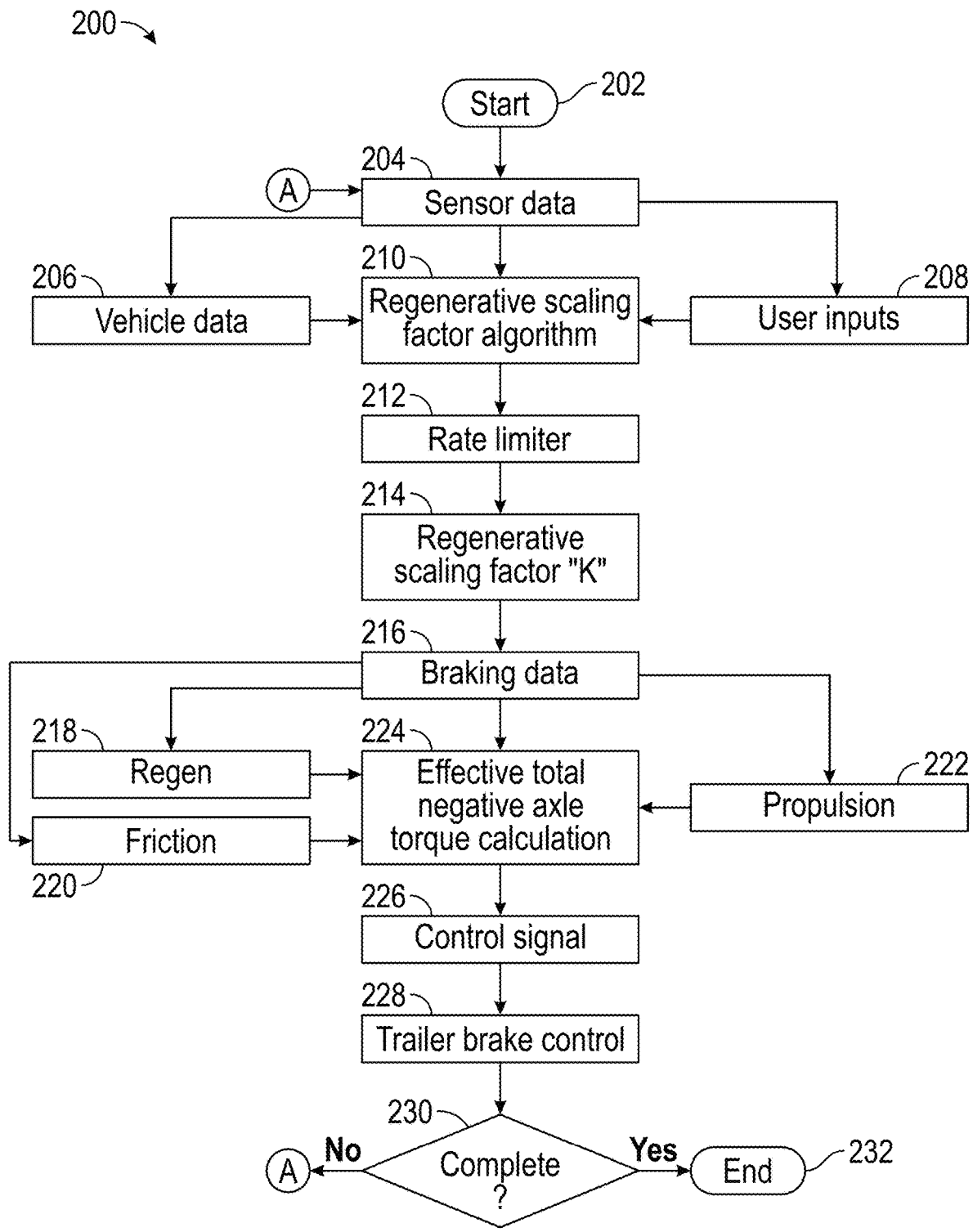
FIG. 2 is a flowchart of process for controlling braking of a trailer that is coupled to a vehicle having regenerative braking capabilities, and that can be implemented in connection with the vehicle and control system of FIG. 1.

FIG. 2 provides a flowchart of process 200 for controlling braking of a trailer that is coupled to a vehicle having regenerative braking capabilities, in accordance with exemplary embodiments. Specifically, as described in greater detail further below, the process 200 recognizes regenerative braking for the vehicle 100, and controls trailer braking after desensitizing the trailer braking response toward the regenerative braking torque, thereby providing the vehicle with greater opportunities to recoup the kinetic energy back into the RESS of the vehicle.

In various embodiments, the process 200 may be implemented in connection with the vehicle 100, the control system 102 and braking system 106 thereof, the trailer 160 and the braking system 166 thereof, and components thereof.

As depicted in FIG. 2, the process 200 begins at step 202. In one embodiment, the process 200 begins when a vehicle is turned "on" or begins operation, for example during a current vehicle drive. For example, in various embodiments, the process 200 may also begin when a driver approaches or enters the vehicle 100, or when the driver turns on the vehicle and/or a driver system or motor therefor (e.g. by turning a key, engaging a keyfob or start button, and so on). In one embodiment, the steps of the process 200 are performed continuously during operation of the vehicle.

Sensor data is obtained at step 204. In various embodiments, sensor data is obtained via each of the sensors of the vehicle's sensor array 120 of FIG. 1. In certain embodiments, the sensor data of step 204 includes the following: (i) friction braking data collected from and/or calculated from data obtained from the one or more friction braking sensors 130 of FIG. 1 (e.g., as to friction braking torque applied by the friction braking system 108 of FIG. 1); (ii) regenerative braking data collected from and/or calculated from data obtained from the one or more regenerative braking sensors 132 of FIG. 1 (e.g., as to regenerative braking torque applied by the regenerative braking system 109 of FIG. 1); (iii) speed data from the one or more speed sensors 133 of FIG. 1 (e.g., as to a speed of the vehicle 100 and/or wheels 112 thereof); (iv) mass data from the one or more mass sensors 134 of FIG. 1 and/or as calculated or estimated from one or more other vehicle parameters (e.g., as to a mass of the trailer 160 of FIG. 1); (v) input data from the one or more input sensors 135 of FIG. 1 (e.g., as to a driver's engagement of the brake pedal 107 of FIG. 1 and a driver's selection as to user inputs as to the user's personal preference to trailer brake reaction in response to regenerative braking; and (vi) RESS data from the one or more RESS sensors 136 of FIG. 1 (e.g., as to a charging capability of the RESS 111 of FIG. 1 and/or changes thereto). In certain embodiments, the sensor data may also include data from one or more other sensors 137 of FIG. 1 (such as, by way of example, requested friction braking by the drive system, vehicle IMU data, vehicle acceleration data, vehicle detection data, and so on).

In certain embodiments, the sensor data of step 204 may be separated into (and/or considered separately as) vehicle data (step 206) and user inputs (step 208). In certain embodiments, the vehicle data of step 206 comprises the friction braking data, the regenerative braking data, the speed data, the mass data, the friction braking force requested by the drive system, and the RESS data (and in certain embodiments other sensor data) of step 204. Also in various embodiments, the user inputs of step 208 include the input data from step 204 (e.g., as to the driver's engagement of the brake pedal and/or the driver's personal preference to trailer brake reaction in response to regenerative braking forces).

In various embodiments, the sensor data of step 204 (including the vehicle data of step 206 and the user inputs of step 208) are provided to and utilized by a regenerative scaling factor algorithm (step 210). In various embodiments, during step 210, the regenerative scaling factor algorithm utilize the various sensor data (including vehicle speed, trailer mass, RESS charging capability, user specific trailer brake inputs, and/or other parameters) in order to determine various states of stable versus unstable regenerative scaling factors. For example, in certain embodiments, greater vehicle speed and/or greater trailer mass, among other possible factors, may result in relatively higher potential for unstable states, and so on.

In various embodiments, the regenerative scaling factor algorithm is executed by the processor 142 of FIG. 1. Also in various embodiments, the regenerative factor algorithm is stored in the memory 144 of FIG. 1, for example as part of the program(s) 152, table(s) 155, and/or stored values 157. In certain embodiments, the regenerative factor algorithm comprises a series of look-up tables stored in the memory 144 of FIG. 1; however, this may vary in other embodiments.

In various embodiments, a rate limiter is applied (step 212) in order to generate a regenerative scaling factor "K" (step 214). In various embodiments, the rater limiter is applied by the processor 142 of FIG. 1 based on the regenerative scaling factor algorithm of step 210, in order to desensitize the effect of regenerative braking torque on the trailer brake control while still maintaining control of the vehicle 100 and the trailer 160. In various embodiments, the regenerative scaling factor "K" determines the extent to which the trailer braking control will provide trailer braking control based on the regenerative braking component of the braking torque of the vehicle In certain embodiments, the regenerative scaling factor "K" is dynamic in nature, and is based upon the sensor data (including the vehicle data and the user inputs). In various embodiments, the regenerative scaling factor "K" is between zero (0) and one (1), depending upon the vehicle conditions (vehicle data) and the user's trailer braking preferences (user inputs).

In various embodiments, the regenerative scaling factor "K" increases (and ultimately approaches the value of "1") when the stability of the vehicle 100 and/or the trailer 160 may otherwise be in jeopardy. Conversely, also in various embodiments, the regenerative scaling factor "K" decreases (and ultimately approaches the value of "0") when the stability of the vehicle 100 and the trailer 160 is established.

For example, in various embodiments, the regenerative scaling factor "K" may be directly proportional to parameters such as vehicle speed and/or trailer that could otherwise cause vehicle instability (and/or in certain embodiments stability of the trailer). Specifically, in certain embodiments, the regenerative scaling factor "K" is closer to a value of "1" when vehicle speed and/or trailer mass increases (and/or when other conditions are present that could lead to vehicle and/or trailer instability). Conversely, in certain embodiments, the regenerative scaling factor "K" is closer to a value of "0" when vehicle speed and/or trailer mass decreases (and/or when other conditions are present that establish vehicle and trailer stability).

Also in various embodiments, the regenerative scaling factor "K" is also dependent upon the charging capability of the RESS 111 of FIG. 1. For example, in various embodiments, with other factors held constant, the regenerative scaling factor "K" increases (i.e., is closer to a value of "1") when the charging capability of the RESS 111 is relatively small (i.e., when the RESS 111 is relatively fully charged, such that imminent charging is not necessary). Conversely, also in various embodiments, with other factors held constant, the regenerative scaling factor "K" decreases (i.e., is closer to a value of "0") when the charging capability of the RESS 111 is relatively large (i.e., when the RESS 111 is relatively fully discharged, such that imminent charging may be required).

Also in various embodiments, with respect to the user inputs, the regenerative scaling factor "K" may have a relatively higher value (i.e., closer to a value of "1") or a relatively smaller value (i.e., closer to a value of "0") depending upon the user inputs (e.g., as to the user's personal preference to trailer brake reaction in response to regenerative braking forces).

In various embodiments, braking data is obtained (step 216). Specifically, in various embodiments, braking data is obtained with respect to each of the following: (i) regenerative braking torque applied by the regenerative braking system 109 of FIG. 1 (step 218); (ii) friction braking torque applied by the friction braking system 108 of FIG. 1 (step 220); and (iii) a requested friction braking torque (step 222). In various embodiments: (i) the regenerative braking torque is obtained via the regenerative braking sensors 132 of FIG. 1; and (ii) the friction braking torque is obtained via the friction braking sensors 130 of FIG. 1. Also in various embodiments, the requested friction braking torque is obtained by one or more input sensors 135 of FIG. 1 (e.g., as to a driver's engagement of the brake pedal 107) and/or one or more other sensors 137 of FIG. 1 (e.g., as to a measure of braking requested via the drive system 110).

In various embodiments, the braking data of steps 216-222 are utilized in calculating a total negative axle torque for the vehicle (step 224). In various embodiments, the total negative axle torque represents an amount of vehicle braking torque that is to be used to generate a proportional corresponding trailer braking torque. Specifically, in various embodiments, during step 224, the processor 142 of FIG. 1. calculates the total negative axle torque based on the regenerative braking torque, the friction braking torque, and the requested friction braking torque of steps 216-222.

In various embodiments, the total negative axle torque (or "TNAT") is calculated in step 224 in accordance with the following equation:

$$TNAT = RegenForce * K + FrictionForce - PropFrictionRequestedForce * (1-K) \quad \text{(Equation 1)},$$

in which "RegnForce" represents the regenerative braking force (or torque) for the vehicle 100, "FrictionForce" represents the friction braking force (or torque) for the vehicle 100, "PropFrictionRequestedForce" represents the requested friction braking force (or torque) for the vehicle 100 (e.g., by the drive system 100, or propulsion system, thereof), and "K" represents the dynamic regenerative scaling factor described above.

Applicant also notes that in certain embodiments it is possible for a regenerative braking event request to be honored instead via friction braking. For example, this could be due to the RESS capacity having no room to charge, and/or by thermal issues that may prevent charging, and so on. In various embodiments, by accounting for the third term in Equation 1 above (namely, requested friction braking force from the drive system of the vehicle, or "PropFrictionRequestedForce", the control equation is able to maintain the same "desensitized" response towards this frictional torque as if this was a regenerative braking event.

In various embodiments, a control signal is generated (step 226). In various embodiments, the control signal comprises a trailer brake control signal for providing trailer braking in a magnitude that is proportional to the total negative axle torque (TNAT) that was calculated in accordance with Equation 1 above. Also in various embodiments, the control signal is generated by the processor 142 of FIG. 1 and transmitted to the trailer braking system 166 of FIG. 1.

In various embodiments, trailer brake control is implemented (step 228). In various embodiments, during step 228, trailer braking for the trailer 160 of FIG. 1 is implemented via the trailer braking system 166 of FIG. 1 based on the control signal. In various embodiments, trailer braking torque is provided for the trailer 160 by the trailer braking system 166 with a magnitude that is equal to the control signal.

In various embodiments, a determination is made as to whether the process 200 is complete (step 230). In various embodiments, this determination is made by the processor 142 of FIG. 1 based on whether a current vehicle drive is ongoing. In various embodiments, if it is determined that the process 200 is not complete (i.e., that the current vehicle drive is ongoing), then the process returns to step 204, and the process repeats (beginning with step 204) in a new iteration, and with updated sensor data. Conversely, in various embodiments, if is instead determined that the process 200 is complete (i.e., that the current vehicle drive is complete), then the process 200 terminates at step 232.

Accordingly, methods, systems, and vehicles are provided for controlling trailer braking for vehicles having regenerative braking capability. In various embodiments, the disclosed methods and systems control trailer braking after desensitizing the trailer braking response toward the regenerative braking torque. In various embodiments, the disclosed methods and systems thereby providing the vehicle with greater opportunities to recoup the kinetic energy back into the RESS of the vehicle, while also helping to ensure vehicle stability along with vehicle driving range.

In various embodiments, per the discussion above, these goals are achieved by sensitivity (or risk scaling factor) of the trailer brake response towards regenerative forces taking place on the vehicle. In various embodiments, also per the discussion above, the risk scaling factor is determined as a dynamic value that is dependent upon parameters such as vehicle speed, trailer mass, RESS charging capability, user inputs, and/or other factors in order to determine the need to recoup energy or prioritization of system stability. Also in various embodiments, the dynamic scaling factor is utilized in calculating the effective control signal to which the trailer brake output is to be proportional. In various embodiments, per the discussion above, the control signal is generated as the combination of regenerative braking forces, friction braking forces, and propulsion requested friction braking.

Also similar to the discussion above, in various embodiments the dynamic scaling factor serves to desensitize the trailer braking to deceleration forces that are regenerative in nature, thereby creating more opportunities to recoup vehicle kinetic energy back into the RESS of the vehicle. Also in various embodiments, the disclosed methods and systems serve to proactively maintain system stability, including by using vehicle sensor data to determine the likelihood of the vehicle becoming unstable. In various embodiments, in response to these factors, disclosed methods and system adjust the dynamic trailer braking scaling factor accordingly in order to balance between system stability and vehicle range optimization.

It will be appreciated that the systems, vehicles, and methods may vary from those depicted in the Figures and described herein. For example, the vehicle 100 of FIG. 1, the control system 102 and the braking system 106 thereof, the trailer 160 and the braking system 166 thereof, and/or components of the vehicle 100 and/or the trailer 160 of FIG.

1 may vary in different embodiments. It will similarly be appreciated that the steps of the process 200 may differ from that depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method comprising:
obtaining sensor data via one or more sensors of a vehicle having both friction braking and regenerative braking capabilities and coupled to a trailer, the sensor data comprising:
friction braking data as to a vehicle friction braking force for the vehicle; and
regenerative braking sensor data as to a vehicle regenerative braking force for the vehicle; and
controlling braking of the trailer by providing trailer braking force, via instructions provided by a processor of the vehicle, based on both the friction braking data and the regenerative braking sensor data, with a sensitivity toward the vehicle regenerative braking force such that the trailer braking force is affected differently by the vehicle regenerative braking force versus the vehicle friction braking force, wherein:
the step of obtaining the sensor data further comprises obtaining additional sensor data for the vehicle from the one or more sensors;
the sensor data further comprises requested braking force data pertaining to a requested friction braking force from a drive system of the vehicle;
the step of controlling the braking of the trailer further comprises:
calculating, via the processor, a dynamic regenerative scaling factor based on the additional sensor data; and
providing the trailer braking force, via the instructions provided by the processor, based on both the friction braking data and the regenerative braking sensor data, with the sensitivity toward the vehicle regenerative braking force based on the dynamic regenerative scaling factor, wherein the step of providing the trailer braking force comprises:
calculating a total negative axle torque based on each of the following: the friction braking data, the regenerative braking sensor data, the requested braking force data, and the dynamic regenerative scaling factor; and
providing the trailer braking force, via the instructions provided by the processor, to be proportional to the total negative axle torque;
wherein the total negative axle torque is calculated by the processor in accordance with the following equation:

$$TNAT = RegenForce * K + FrictionForce - PropFrictionRequestedForce * (1-K),$$

in which "TNAT" represents the total negative axle torque; "RegnForce" represents the vehicle regenerative braking force; "FrictionForce" represents the vehicle friction braking force; "PropFrictionRequestedForce" represents the requested friction braking force from the drive system of the vehicle; and "K" represents the dynamic regenerative scaling factor.

2. The method of claim 1, wherein:
the additional sensor data comprises RESS data as to a charging capability of a rechargeable energy storage system (RESS) of the vehicle; and
the dynamic regenerative scaling factor reflects the charging capability of the RESS based on the RESS data.

3. The method of claim 1, wherein the dynamic regenerative scaling factor reflects a stability of the vehicle.

4. The method of claim 3, wherein:
the additional sensor data pertains to a speed of the vehicle; and
the dynamic regenerative scaling factor reflects the stability of the vehicle based at least in part on the speed of the vehicle.

5. The method of claim 3, wherein:
the additional sensor data pertains to a mass of the trailer; and
the dynamic regenerative scaling factor reflects the stability of the vehicle based at least in part on the mass of the trailer.

6. The method of claim 3, wherein the dynamic regenerative scaling factor also reflects user inputs from a user of the vehicle with regard to the user's personal preference to trailer brake reaction in response to regenerative braking forces.

7. A system comprising:
one or more sensors configured to obtain sensor data for a vehicle having both friction braking and regenerative braking capabilities and coupled to a trailer, the sensor data comprising:
friction braking data as to a vehicle friction braking force for the vehicle; and
regenerative braking sensor data as to a vehicle regenerative braking force for the vehicle; and
a processor that is coupled to the one or more sensors and that is configured to at least facilitate controlling braking of the trailer by providing trailer braking force, via instructions provided by the processor, based on both the friction braking data and the regenerative braking sensor data, with a sensitivity toward the vehicle regenerative braking force such that the trailer braking force is affected differently by the vehicle regenerative braking force versus the vehicle friction braking force, wherein:
the one or more sensors are further configured to obtain additional sensor data for the vehicle;
the sensor data further comprises requested braking force data pertaining to a requested friction braking force from a drive system of the vehicle; and
the processor is further configured to at least facilitate:
calculating a dynamic regenerative scaling factor that reflects a stability of the vehicle, based on the additional sensor data; and
providing the trailer braking force, via the instructions provided by the processor, based on both the friction braking data and the regenerative braking sensor data, with the sensitivity toward the vehicle regenerative braking force based on the dynamic regenerative scaling factor, wherein the processor is further configured to at least facilitate:

calculating a total negative axle torque based on each of the following: the friction braking data, the regenerative braking sensor data, the requested braking force data, and the dynamic regenerative scaling factor;

providing the trailer braking force, via the instructions provided by the processor, to be proportional to the total negative axle torque; and calculating the total negative axle torque in accordance with the following equation:

$$TNAT = RegenForce*K + FrictionForce - PropFrictionRequestedForce*(1-K),$$

in which "TNAT" represents the total negative axle torque; "RegnForce" represents the vehicle regenerative braking force; "FrictionForce" represents the vehicle friction braking force; "PropFrictionRequestedForce" represents the requested friction braking force from the drive system of the vehicle; and "K" represents the dynamic regenerative scaling factor.

8. The system of claim 7, wherein:
the additional sensor data comprises RESS data as to a charging capability of a rechargeable energy storage system (RESS) of the vehicle; and
the dynamic regenerative scaling factor reflects the charging capability of the RESS based on the RESS data.

9. The system of claim 7, wherein:
the additional sensor data pertains to a speed of the vehicle; and
the dynamic regenerative scaling factor reflects the stability of the vehicle based at least in part on the speed of the vehicle.

10. The system of claim 7, wherein:
the additional sensor data pertains to a mass of the trailer; and
the dynamic regenerative scaling factor reflects the stability of the vehicle based at least in part on the mass of the trailer.

11. The system of claim 7, wherein the dynamic regenerative scaling factor also reflects user inputs from a user of the vehicle as to the user's personal preference to trailer brake reaction in response to regenerative braking forces.

12. A vehicle comprising:
a body configured to be coupled to a trailer having a trailer braking system;
a vehicle braking system having both friction braking and regenerative braking capabilities;
one or more sensors configured to obtain sensor data for the vehicle, the sensor data comprising:
friction braking data as to a vehicle friction braking force for the vehicle; and
regenerative braking sensor data as to a vehicle regenerative braking force for the vehicle; and
a processor that is coupled to the one or more sensors and that is configured to at least facilitate controlling braking of the trailer by providing trailer braking force, via instructions provided by the processor to the trailer braking system, based on both the friction braking data and the regenerative braking sensor data, with a sensitivity toward the vehicle regenerative braking force such that the trailer braking force is affected differently by the vehicle regenerative braking force versus the vehicle friction braking force, wherein:
the one or more sensors are further configured to obtain additional sensor data for the vehicle;
the sensor data further comprises requested braking force data pertaining to a requested friction braking force from a drive system of the vehicle; and
the processor is further configured to at least facilitate:
calculating a dynamic regenerative scaling factor that reflects a stability of the vehicle, based on the additional sensor data; and
providing the trailer braking force, via the instructions provided by the processor, based on both the friction braking data and the regenerative braking sensor data, with the sensitivity toward the vehicle regenerative braking force based on the dynamic regenerative scaling factor, wherein the processor is further configured to at least facilitate:
calculating a total negative axle torque based on each of the following: the friction braking data, the regenerative braking sensor data, the requested braking force data, and the dynamic regenerative scaling factor;
providing the trailer braking force, via the instructions provided by the processor, to be proportional to the total negative axle torque; and
calculating the total negative axle torque in accordance with the following equation:

$$TNAT = RegenForce*K + FrictionForce - PropFrictionRequestedForce*(1-K),$$

in which "TNAT" represents the total negative axle torque; "RegnForce" represents the vehicle regenerative braking force; "FrictionForce" represents the vehicle friction braking force; "PropFrictionRequestedForce" represents the requested friction braking force from the drive system of the vehicle; and "K" represents the dynamic regenerative scaling factor.

* * * * *